United States Patent [19]
Bergano et al.

[11] Patent Number: 5,309,530
[45] Date of Patent: May 3, 1994

[54] TECHNIQUE UTILIZING STRESS-INDUCED BIREFRINGENCE FOR REDUCING POLARIZATION DEPENDENT HOLE-BURNING IN AN AMPLIFIED OPTICAL TRANSMISSION SYSTEM

[75] Inventors: Neal S. Bergano, Lincroft; Vincent J. Mazurczyk, Manalapan; Paul F. Wysocki, Scotch Plains, all of N.J.

[73] Assignee: AT&T Bell Laboratories, Murray Hill, N.J.

[21] Appl. No.: 56,213

[22] Filed: Apr. 30, 1993

[51] Int. Cl.$^5$ .......................... G02B 6/10; G02B 5/30; H01S 3/10
[52] U.S. Cl. .......................................... 385/1; 385/27; 385/31; 385/39; 385/147; 359/181; 359/188; 359/246; 359/256; 359/341; 359/337; 359/339; 372/27; 372/6
[58] Field of Search ...................... 385/1, 2, 4, 7, 8, 9, 385/10, 11, 24, 25, 27, 28, 31, 32, 37, 38, 39, 147; 359/122, 156, 245, 246, 256, 301, 333, 341, 345, 337, 339, 181, 188; 372/27, 26, 14, 108, 6

[56] References Cited

U.S. PATENT DOCUMENTS

| | | | |
|---|---|---|---|
| 4,389,090 | 6/1983 | LeFevre | 385/11 X |
| 4,762,384 | 8/1988 | Hegarty | 385/11 X |
| 4,805,977 | 2/1989 | Tamura et al. | 385/38 X |
| 4,923,291 | 5/1990 | Edagawa et al. | 372/27 X |
| 4,988,169 | 1/1991 | Walker | 385/11 X |
| 5,031,236 | 7/1991 | Hodgkinson et al. | 385/11 X |
| 5,034,679 | 7/1991 | Henderson et al. | 324/96 |
| 5,043,996 | 8/1991 | Nilsson et al. | 372/94 |
| 5,101,461 | 3/1992 | Nakajima | 385/38 X |
| 5,127,066 | 6/1992 | Poggiolini | 385/24 |
| 5,191,631 | 3/1993 | Rosenberg | 385/38 X |
| 5,218,652 | 6/1993 | Lutz | 385/11 X |
| 5,223,705 | 6/1993 | Aspell et al. | 372/27 X |

OTHER PUBLICATIONS

"Observation of New Polarisation Dependence Effects in Long Haul Optically Amplified System" M. G. Taylor, OFC '93 Post-deadline paper, Feb. 1993.
"Spectral Gain Hole-Burning at 1.53 μm in Erbium-Doped Fiber Amplifiers" E. Desurvire, et al. IEEE Photonics Technology Letters, vol. 2, No. 4, Apr. 1990.
"Polarized Fluorescence Line Narrowing Measurements of Nd Laser Glasses: Evidence of Stimulated Emission Cross Section Anisotropy" D. W. Hall, Appl. Phys. Lett., vol. 42, No. 2, Jan. 15, 1983. pp. 157-159.
"Spectral and Polarization Hold Burning in Neodymium Glass Lasers" D. W. Hall et al. IEEE J. of Quantum Electronics, vol. QE-19, No. 11, Nov. 1983, pp. 1704-1717.

*Primary Examiner*—Brian Healy
*Attorney, Agent, or Firm*—Robert P. Marley

[57] ABSTRACT

A technique for reducing signal degradation and fading within a long optical transmission system by minimizing polarization dependent hole-burning ("PDHB") through the cyclic stressing of a birefringent optical fiber to modulate the SOP of an optical signal launched into the transmission system. This effectively reduces the degree of polarization of the launched optical signal, without degrading the noise and dispersion characteristics of the signal. The modulation frequency of the SOP is chosen to ensure that the launched signal does not remain at a particular SOP long enough to anisotropically saturate any optical amplifier employed within the transmission system, and give rise to PDHB.

10 Claims, 1 Drawing Sheet

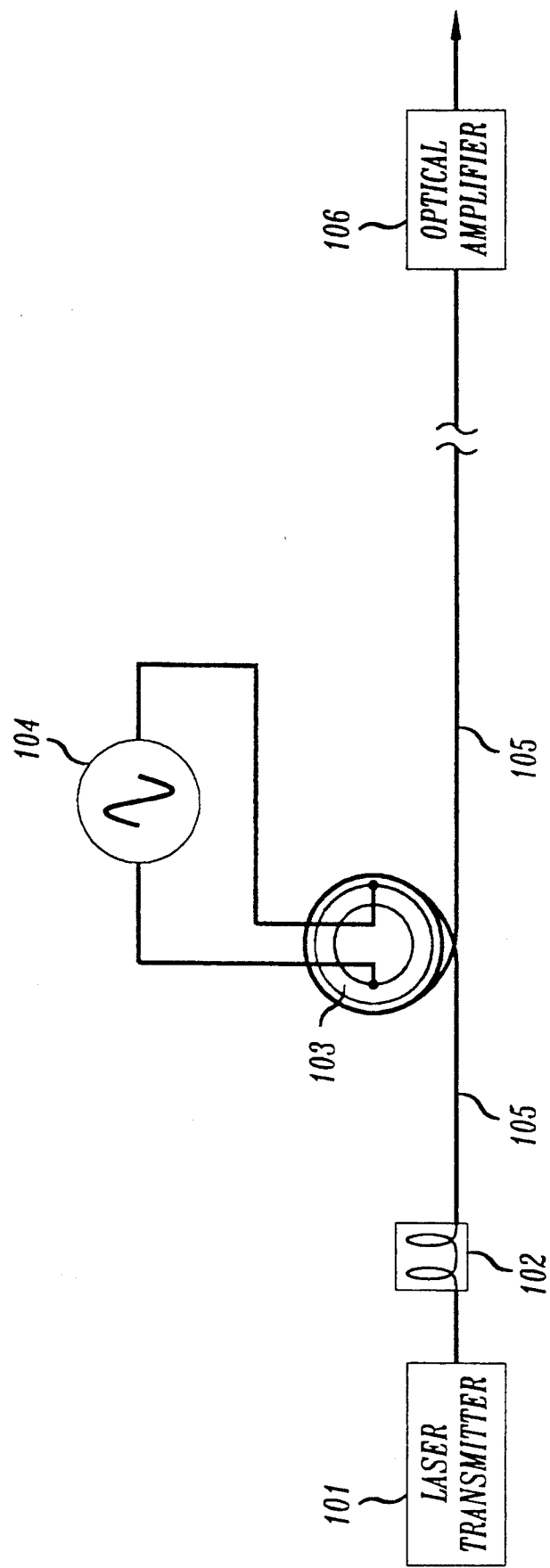

TECHNIQUE UTILIZING STRESS-INDUCED BIREFRINGENCE FOR REDUCING POLARIZATION DEPENDENT HOLE-BURNING IN AN AMPLIFIED OPTICAL TRANSMISSION SYSTEM

TECHNICAL FIELD

The invention relates to the optical transmission of information and, more particularly, to improving transmission capabilities over very long optical transmission paths employing intermediate repeater amplifiers.

BACKGROUND OF THE INVENTION

Very long optical fiber transmission paths, such as those employed in undersea or trans-continental terrestrial lightwave transmission systems which employ optical amplifier repeaters, are subject to decreased performance due to a host of impairments that increase as a function of the length of the optical fiber comprising the transmission path. Typically, in such long optical transmission systems, these impairments vary with time and cause a random fluctuation in the signal-to-noise ratio ("SNR") of the transmission path. This random fluctuation contributes to a phenomenon known as signal fading. Signal fading can result in an increased bit error rate ("BER") for digital signals transmitted via the optical fiber path. When the SNR of a digital signal within such a transmission system becomes unacceptably small (resulting in an undesirably high BER), a signal fade is said to have occurred. Experimental evidence has shown that polarization dependent effects, induced by the optical fiber itself and/or other optical components (e.g., repeaters, amplifiers, etc.) along the transmission path, contribute to signal fading and SNR fluctuations. In particular, one of these effects has now been identified as polarization dependent hole-burning ("PDHB"), which is related to the population inversion dynamics of the optical amplifiers. A discussion of hole-burning is provided by D. W. Douglas, R. A. Haas, W. F. Krupke, and M. J. Weber in "Spectral and Polarization Hole Burning in Neodymium Glass Lasers"; IEEE Journal of Quantum Electronics, Vol. QE-19, No. 11, November 1983.

PDHB reduces gain of the optical amplifiers within the long haul transmission system for any signal having a state of polarization ("SOP") parallel to that of the primary optical signal carried by the transmission system. However, the gain provided by these amplifiers for optical signals that have an SOP orthogonal to that of the primary signal remains relatively unaffected. In simplified terms, the primary optical signal produces an anisotropic saturation of the amplifier that is dependent upon the SOP of the primary optical signal. The anisotropic saturation reduces the level of population inversion within the amplifier, and results in a lower gain for optical signals having the same SOP as the primary optical signal. This effectively causes the amplifier to preferentially enhanced noise having an SOP orthogonal to that of the primary signal. This enhanced noise lowers the SNR of the transmission system and causes an increased BER.

Prior methods for reducing signal fading have included the use of systems that actively adjust the SOP of a signal launched into a given optical path as a function of the quality of the signal received at the far end of the path. However, the dynamic polarization controllers and extremely long feedback paths employed within such systems increase overall complexity and costs, and reduce reliability. Another method employs a non-polarized light source to transmit information over an optical fiber path. Since a non-polarized light source shares its optical power equally on two orthogonally oriented planes within the fiber, deleterious polarization dependent effects should be minimized. Unfortunately, non-polarized light sources produce signals having wide bandwidths, which exhibit poor noise and dispersion characteristics that make them impractical for use over very long transmission paths. These previously attempted methods to alleviate signal fading have proved impractical, and fail to specifically address the problem of PDHB.

SUMMARY OF THE INVENTION

The present invention reduces signal degradation and fading within a long optical transmission system by minimizing PDHB through the cyclic stressing of a birefringent optical fiber to modulate the SOP of an optical signal launched into the transmission system. This effectively reduces the degree of polarization of the launched optical signal, without degrading the noise and dispersion characteristics of the signal. The modulation frequency of the SOP is chosen to ensure that the launched signal does not remain at a particular SOP long enough to anisotropically saturate any optical amplifier employed within the transmission system, and give rise to PDHB.

BRIEF DESCRIPTION OF THE DRAWING

In the drawing:

FIG. 1 is a simplified block diagram of first exemplary arrangement, including a piezoelectric cylinder, which facilitates the practice of the invention.

DETAILED DESCRIPTION OF THE INVENTION

FIG. 1 shows a simplified block diagram of an exemplary arrangement facilitating the practice of the invention. As shown, the arrangement includes laser transmitter 101, polarization maintaining fiber ("PMF") 102, piezoelectric cylinder 103, signal generator 104, very long single-mode optical fiber 105, and optical amplifier 106. Laser transmitter 101 produces an encoded optical signal which is routed through PMF 102 and single-mode optical fiber 105 for transmission to a remote receiver. Optical amplifier 106 serves as a repeater amplifier for the encoded optical signal traveling upon single-mode optical fiber 105. A portion of single-mode optical fiber 105, adjacent to laser transmitter 101, is shown to be tightly wound about piezoelectric cylinder 103.

Piezoelectric cylinder 103 is fabricated so that it undergoes dimensional changes as a function of the voltage applied across it. When a potential of $+V$ is applied, cylinder 103 radially expands, and when a potential of $-V$ is applied, cylinder 103 radially contracts. Signal generator 104 produces a sine wave signal, the amplitude of which cyclicly alternates between $+V$ and $-V$. Application of this sine wave signal to piezoelectric cylinder 103 induces a cyclic variation in the cylinder's circumference—resulting in the portion of single-mode optical fiber 105 wound about the cylinder being exposed to an oscillating longitudinal stress.

As is well known, mechanically stressing a single-mode optical fiber alters the polarization characteristics of that fiber. This shift in polarization characteristics is brought about as a result of a phenomenon called stress-induced birefringence. This birefringence causes the SOP of light passing through a mechanically stressed single-mode optical fiber to vary as function of that stress. However, mechanical stress will fail cause a birefringence-induced shift in the polarization of the light traveling within the single-mode optical fiber, if the SOP of that light is aligned with either of the optical fiber's principal birefringence axes. All single-mode optical fibers exhibit some degree of birefringence. As shown in FIG. 1, prior to reaching single mode optical fiber 105, the encoded optical signal produced by laser transmitter 101 is routed through PMF 102. PMF 102, a conventional polarization maintaining fiber (such as the SM.15-P-8/125-UV/UV-400 fiber available from Fujikara, Ltd. of Tokyo, Japan), is adapted to maintain the SOP of the encoded optical signal produced by laser transmitter 101 so that it is not aligned with the primary transmission axes of single-mode optical fiber 105. Ideally, the SOP of the encoded optical signal should be oriented so that it is offset from the principal birefringence axes of single-mode optical fiber 105 by 45°.

Typically, a piezoelectric cylinder 103 should have a diameter of 1.5 to 2 inches (typically, the larger the diameter of the cylinder, the greater the dimensional change induced by the application of a given voltage). Single-mode optical fiber 105 is wound about piezoelectric cylinder 103 between 100 and 150 times. This results in 40 feet or more of single-mode optical fiber 105 being subjected to longitudinal stress as piezoelectric cylinder 103 oscillates. The effectiveness of the birefringence-induced polarization variations within single-mode optical fiber 105 increases with the length of the fiber exposed to the longitudinal stress.

Erbium-doped fiber amplifiers (a type amplifier typically employed as repeaters within long-haul optical fiber transmission systems) require approximately 1 to 2 ms of exposure to an optical signal having a fixed SOP before population inversion levels are reduced by PDHB. This minimum exposure time prior to population inversion reduction is called the amplifier's saturation time ("$t_s$"). If the SOP of a signal traveling through such an amplifier is oscillated at frequency greater than $1/t_s$, PDHB-induced anisotropic saturation will be avoided.

Assuming optical amplifier 106 has a saturation time of 1 ms, the minimum SOP modulation frequency for a signal traveling along single-mode optical fiber 105 would be 1 kHz. However, to ensure that the rate of polarization oscillation is placed well beyond the minimum frequency required to avoid PDHB-induced anisotropic saturation, the frequency of sine wave signal applied to piezoelectric cylinder 103 may be fixed at 10 kHz or greater.

It will be understood that the particular embodiment described above is only illustrative of the principles of the present invention, and that various modifications could be made by those skilled in the art without departing from the scope and spirit of the present invention, which is limited only by the claims that follow. One such modification would include introducing a cyclic torsional, or axial stress upon a single-mode optical fiber to cause a birefringence-induced shift in the SOP of light traveling within the fiber of the first described arrangement.

We claim:

1. An apparatus for reducing the effects of polarization dependent hole-burning within an optical transmission system employing optical fiber amplifiers, comprising:
   means for generating a polarized optical signal;
   means for launching said polarized optical signal into a birefringent optical fiber so that the state of polarization of said polarized optical signal is not aligned with a primary birefringent transmission axis of said birefringent optical fiber;
   means for mechanically stressing said birefringent optical fiber to induce a modulation of the state of polarization of said polarized optical signal, said modulation being at a frequency greater than or equal to $1/t_s$, where $t_s$ is the minimum saturation time exhibited by any of the optical amplifiers within said optical transmission system; and
   means for launching the modulated polarized optical signal into said optical transmission system.

2. The invention of claim 1 wherein said means for mechanically stressing said birefringent optical fiber includes:
   an electrical signal generator adapted to produce a signal having a frequency greater than or equal to $1/t_s$; and
   a piezoelectric cylinder, about the circumference of which a portion of said birefringent optical fiber is tightly wound, said piezoelectric cylinder being adapted to radially expand and contract in response to said signal generated by said electrical signal generator, and thereby subjecting said wound portion of said birefringent optical fiber to a cyclic longitudinal stress.

3. The invention of claim 1 wherein said means for mechanically stressing said birefringent optical fiber includes means for applying a longitudinal stress to said birefringent optical fiber.

4. The invention of claim 1 wherein said means for mechanically stressing said birefringent optical fiber includes means for applying an axial stress to said birefringent optical fiber.

5. The invention of claim 1 wherein said means for mechanically stressing said birefringent optical fiber includes means for applying a torsional stress to said birefringent optical fiber.

6. A method for reducing the effects of polarization dependent hole-burning within an optical transmission system employing optical fiber amplifiers, comprising the steps of:
   generating a polarized optical signal;
   launching said polarized optical signal into a birefringent optical fiber so that the state of polarization of said polarized optical signal is not aligned with a primary birefringent transmission axis of said birefringent optical fiber;
   mechanically stressing said birefringent optical fiber to induce a modulation of the state of polarization of said polarized optical signal, said modulation being at a frequency greater than or equal to $1/t_s$, where $t_s$ is the minimum saturation time exhibited by any of the optical amplifiers within said optical transmission system; and
   launching the modulated polarized optical signal into said optical transmission system.

7. The method of claim 6 wherein said step of mechanically stressing said birefringent optical fiber includes exciting a piezoelectric cylinder, about the circumference of which a portion of said birefringent optical fiber is tightly wound, so that, in response to said excitation, said piezoelectric cylinder radially expands and contracts, and thereby subjects said wound portion of said birefringent optical fiber to a cyclic longitudinal stress.

8. The method of claim 6 wherein said step of mechanically stressing said birefringent optical fiber includes applying a longitudinal stress to said birefringent optical fiber.

9. The method of claim 6 wherein said step of mechanically stressing said birefringent optical fiber includes applying an axial stress to said birefringent optical fiber.

10. The method of claim 6 wherein said step of mechanically stressing said birefringent optical fiber includes applying a torsional stress to said birefringent optical fiber.

* * * * *